(12) United States Patent
Liang

(10) Patent No.: US 9,945,454 B2
(45) Date of Patent: Apr. 17, 2018

(54) MOTORIZED GEAR REDUCER

(71) Applicants: SAFEWAY ELECTRO-MECHANICAL CO., LTD., New Taipei (TW); Chia-Sheng Liang, Taipei (TW)

(72) Inventor: Chia-Sheng Liang, Taipei (TW)

(73) Assignees: SAFEWAY ELECTRO-MECHANICAL CO., LTD., New Taipei (TW); Chia-Sheng Liang, Taipei (TW)

( * ) Notice: Subject to any disclaimer, the term of this patent is extended or adjusted under 35 U.S.C. 154(b) by 0 days.

(21) Appl. No.: 15/281,048

(22) Filed: Sep. 29, 2016

(65) Prior Publication Data

US 2018/0051775 A1    Feb. 22, 2018

(30) Foreign Application Priority Data

Aug. 18, 2016 (TW) .............................. 105126349 A

(51) Int. Cl.
*F16H 3/72* (2006.01)
*F16H 57/021* (2012.01)
*F16H 3/64* (2006.01)

(52) U.S. Cl.
CPC ................ *F16H 3/72* (2013.01); *F16H 3/64* (2013.01); *F16H 57/021* (2013.01)

(58) Field of Classification Search
CPC ...................................... F16H 3/64; F16H 3/72
See application file for complete search history.

(56) References Cited

U.S. PATENT DOCUMENTS

| 6,031,308 | A  | 2/2000  | Kinoshita et al. |
| 6,196,347 | B1 | 3/2001  | Chao et al.      |
| 6,296,072 | B1 | 10/2001 | Turner           |
| 6,629,574 | B2 | 10/2003 | Turner           |
| 7,886,858 | B2 | 2/2011  | Ai               |
| 9,080,657 | B2 * | 7/2015 | Kuo ...................... F16H 37/042 |

* cited by examiner

*Primary Examiner* — Erin D Bishop
(74) *Attorney, Agent, or Firm* — Chun-Ming Shih

(57) ABSTRACT

A motorized gear reducer is provided with an axial support shaft in a housing; a speed reduction device including at least three stages of a sunless planetary gear train, each stage including a stationary ring gear, a rotatable ring gear served as a torque output, and a carrier on the support shaft and served as a torque input of each stage; planet gear sets, each in the carrier and including a first planet gear meshing the stationary ring gear, and a second planet gear meshing the rotatable ring gear, the rotatable ring gear of the last stage extending out of the housing to serve as a torque output of the speed reduction device; and a hollow motor surrounding the first stage and including a stator, a rotor surrounded and driven by the stator, and windings for rotating the rotor.

8 Claims, 8 Drawing Sheets

MOTORIZED GEAR REDUCER

BACKGROUND OF THE INVENTION

1. Technical Field

The invention relates to gear reducers and more particularly to a motorized gear reducer having a fixed support shaft and a multi-stage, sunless planetary gear train revolving about the support shaft.

2. Related Art

A motorized gear reducer (or geared motor) is a combination of an electric motor and a reduction gear (or a non-gear based reducer). Typically, a motor is made larger and has a high manufacturing cost if low speed and high torque are required in operation. To the contrary, a motor is made smaller and has a low manufacturing cost if high speed and low torque are required in operation. The speed reduction device can convert itself in a high speed low torque operation into a low speed high torque operation. In short, high torque output for a lift, winch, or robot is made possible for a small motor. In another application, a miniature speed reduction device can drive a cartridge of digital camera. Thus, combination of an electric motor and a reduction gear as drive means has found a wide variety of applications.

A conventional motorized gear reducer includes a pinion mounted on a motor shaft and meshed a gear (or a train of gears) so as to decrease speed of the motor shaft at an output. Alternatively, a worm is mounted on the motor shaft and meshes with a worm gear so as to decrease speed of the motor shaft at the output. Still alternatively, a planetary gear train is mounted coaxially with the motor shaft and meshes therewith so as to decrease speed of the motor shaft at the output. In this case, the planetary gear train is used as a speed reduction gear. Above characteristics are disclosed by U.S. Pat. Nos. 6,196,347, 6,296,072, 6,629,574, and 6,031,308. Specifically, U.S. Pat. Nos. 6,196,347 and 6,031,308 each discloses a Ferguson's mechanical paradox gear in a motorized gear reducer. Specifically, U.S. Pat. Nos. 6,296,072 and 6,629,574 each discloses a two-stage gear reduction mechanism. However, all of above patents are bulky due to the excessive length of the motor shaft. Therefore they are not applicable to environments having limited longitudinal length.

U.S. Pat. No. 7,886,858 discloses an integrated electric motor hub drive that combines an electric motor subassembly, a sunless differential planetary gear drive subassembly, and a hub bearing assembly together in a coaxial assembly to provide a compact high gear reduction electric hub drive system. The patent solves the problem of bulky motor and especially shortens an axial length of the motor. However, the drive shaft is axially connected to a hub spindle, supported by the hub bearing assembly, and driven by the driving ring gear prior to outputting torque. Unfortunately, this increases the axial length of the motor and in turn does not solve the problem of being excessive in axial length of the motor. The patent neither teaches the difference between the number of the teeth of the stationary ring gear and that of the driving ring gear nor teaches an optimum number of the planet gears. Further, the patent is silent about the benefit of the optimum number of the planet gears on the high gear reduction.

Notwithstanding the prior art, the invention is neither taught nor rendered obvious thereby.

BRIEF SUMMARY

It is desirable to provide an improved motorized gear reducer which addresses the above described problems including a bulky motor, an increased axial length of the motor, and a low gear reduction.

It is therefore an object of the invention to provide a motorized gear reducer disposed in a housing served as a fixed end, the housing having a closed surface at a first end and an axial channel through a second end, comprising a support shaft axially disposed in the housing and having a first end secured to the closed surface and a second end passing through the axial channel; a speed reduction device including at least three stages of a sunless planetary gear train, each stage of the sunless planetary gear train including a stationary ring gear, a rotatable ring gear served as a torque output of each stage of the sunless planetary gear train, and a carrier mounted on the support shaft and served as a torque input of each stage of the sunless planetary gear train; a plurality of planet gear sets, each disposed in the carrier and including a first planet gear meshing the stationary ring gear, and a second planet gear meshing the rotatable ring gear wherein except the carrier of a first stage of the sunless planetary gear train and the rotatable ring gear of a last stage of the sunless planetary gear train, the carrier of each of the remaining stages of the sunless planetary gear train is secured to the rotatable ring gear of an adjacent stage of the sunless planetary gear train, and the rotatable ring gear of the last stage of the sunless planetary gear train extends out of the axial channel of the housing to serve as a torque output of the speed reduction device; and a hollow motor surrounding the first stage of the sunless planetary gear train and including a stator on an outermost portion, a rotor surrounded by the stator and driven by the stator, and a plurality of windings for rotating the rotor; wherein the stator is disposed in the housing; wherein the rotor includes an internal ring member extending radially to separate the stationary ring gear of the first stage sunless planetary gear train from the rotatable ring gear thereof, and the ring member being around the carrier of the first stage of the sunless planetary gear train; wherein the number of teeth of the first planet gear of each stage of the sunless planetary gear train is equal to that of the second planet gear of each stage of the sunless planetary gear train; wherein the number of teeth of the rotatable ring gear is not equal to that of the stationary ring gear; and wherein a difference between the number of teeth of the rotatable ring gear and that of the stationary ring gear is a multiple of the number of the planet gear sets.

Preferably, the difference is equal to the number of the planet gear sets.

Preferably, a modulus of the first planet gear is different from that of the second planet gear, a modulus of the stationary ring gear is equal to that of the first planet gear, and a modulus of the rotatable ring gear is equal to that of the second planet gear.

Preferably, each stationary ring gear is fastened in the housing.

Preferably, the first planet gear and the second planet gear are coaxially disposed and co-rotated, and each carrier includes two holes at two ends respectively, the holes being adapted to fixedly fasten two ends of an axis of each of the first and second planet gears together.

Preferably, the rotatable ring gear of the last stage of the sunless planetary gear train is combined with both a disc and a sleeve to form a rotatable ring gear assembly, the sleeve is put on the support shaft, and an end surface of the disc is taken as a torque output.

Preferably, the rotatable ring gear of the last stage of the sunless planetary gear train is integrally formed with a disc to form a rotatable ring gear assembly having a cylindrical surface pivotally supported by the housing, and an end surface of the disc is taken as a torque output.

Preferably, further comprises two opposite projections extending inward from the ring member, and two hole members each formed through the projection, two opposite recesses formed on the carrier of the first stage of the sunless planetary gear train, and two threaded holes each formed through the recess wherein the projections are fitted in the recesses respectively, the hole members are aligned with the threaded holes respectively, and two screws are driven through the hole members into the threaded holes respectively to fasten the rotor and the carrier of the first stage sunless planetary gear train together.

Preferably, the hollow motor is a brushless direct current (DC) motor.

It is another object of the invention to provide a motorized gear reducer disposed in a housing served as a fixed end, the housing having a closed surface at a first end and an axial channel through a second end, comprising a support shaft axially disposed in the housing and having a first end secured to the closed surface and a second end passing through the axial channel; a speed reduction device including a first stage of a sunless planetary gear train and a second stage of the sunless planetary gear train, each of the first and second stages of the planetary gear train including a stationary ring gear, a rotatable ring gear served as a torque output of each of the first and second stages of the planetary gear train, and a carrier mounted on the support shaft and served as a torque input of each of the first and second stages of the planetary gear train; a plurality of planet gear sets, each disposed in the carrier and including a first planet gear meshing the stationary ring gear, and a second planet gear meshing the rotatable ring gear wherein the carrier of the first stage of the planetary gear train is secured to an internal ring member of a rotor of a hollow motor to serve as a power source of the speed reduction device, and the rotatable ring gear of the second stage of the planetary gear train extends out of the axial channel of the housing to serve as a torque output of the speed reduction device; and a hollow motor surrounding the first stage of the planetary gear train and including a stator on an outermost portion, a rotor surrounded by the stator and driven by the stator, and a plurality of windings for rotating the rotor; wherein the stator is disposed in the housing; wherein the rotor includes an internal ring member extending radially to separate the stationary ring gear of the first stage of the planetary gear train from the rotatable ring gear thereof, and the ring member being around the carrier of the first stage of the planetary gear train; wherein the number of teeth of the first planet gear of each of the first and second stages of the planetary gear train is equal to that of the second planet gear of each of the first and second stages of the planetary gear train; wherein the number of teeth of the rotatable ring gear is not equal to that of the stationary ring gear; and wherein a difference between the number of teeth of the rotatable ring gear and that of the stationary ring gear is a multiple of the number of the planet gear sets.

Preferably, the difference is equal to the number of the planet gear sets.

Preferably, a modulus of the first planet gear is different from that of the second planet gear, a modulus of the stationary ring gear is equal to that of the first planet gear, and a modulus of the rotatable ring gear is equal to that of the second planet gear.

Preferably, each stationary ring gear is fastened in the housing.

Preferably, the first planet gear and the second planet gear are coaxially disposed and co-rotated, and each carrier includes two holes at two ends respectively, the holes being adapted to fixedly fasten two ends of an axis of each of the first and second planet gears together.

Preferably, the rotatable ring gear of the second stage of the planetary gear train is combined with both a disc and a sleeve to form a rotatable ring gear assembly, the sleeve is put on the support shaft, and an end surface of the disc is taken as a torque output.

Preferably, the rotatable ring gear of the second stage of the planetary gear train is integrally formed with a disc to form a rotatable ring gear assembly having a cylindrical surface pivotally supported by the housing, and an end surface of the disc is taken as a torque output.

Preferably, further comprises two opposite projections extending inward from the ring member, and two hole members each formed through the projection, two opposite recesses formed on the carrier of the first stage of the planetary gear train, and two threaded holes each formed through the recess wherein the projections are fitted in the recesses respectively, the hole members are aligned with the threaded holes respectively, and two screws are driven through the hole members into the threaded holes respectively to fasten the rotor and the carrier of the first stage of the planetary gear train together.

Preferably, the hollow motor is a brushless direct current (DC) motor.

By utilizing the invention, the following advantages are obtained: The sun gear of the planetary gear train of the conventional speed reduction device is eliminated and replaced with another ring gear, i.e., a total of two ring gears. Further, the space previously occupied by the sun gear is used to accommodate a support shaft with the planetary gear trains being adapted to revolve about. A high gear reduction ratio is obtained by dividing the number of teeth of the rotatable ring gear by a difference of the number of teeth of the rotatable ring gear and the number of teeth of the stationary ring gear. The rotor is disposed around the first stage of the planetary gear train to separate one ring gear of the first stage of the planetary gear train from the other ring gear of the first stage of the planetary gear train. Furthermore, the rotor is secured to the carrier of the first stage of the planetary gear train. The space of the motorized gear reducer is greatly reduced. Gear reduction ratio is greatly increased with space of the motorized gear reducer being greatly reduced. The construction is greatly simplified to provide a compact motorized gear reducer having a high gear reduction ratio.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
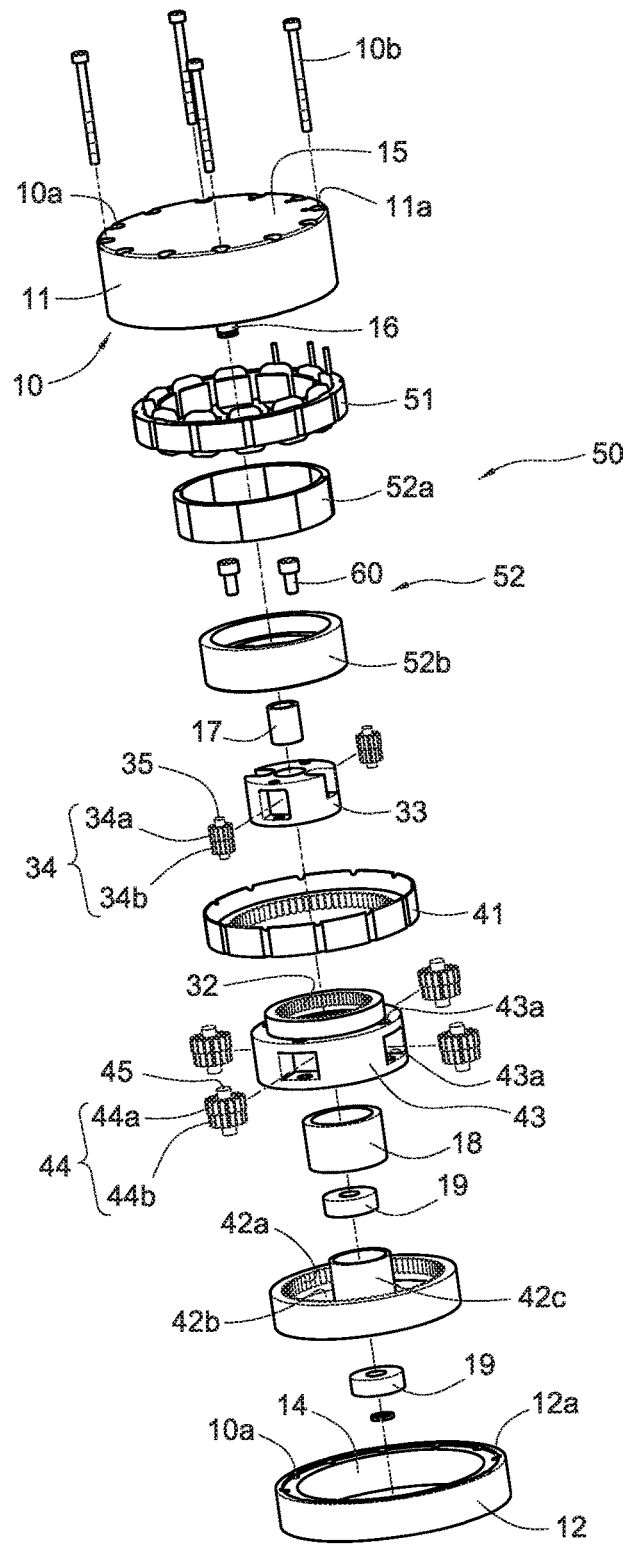
FIG. 1 is an exploded view of a motorized gear reducer according to a first preferred embodiment of the invention.
Figure 2:
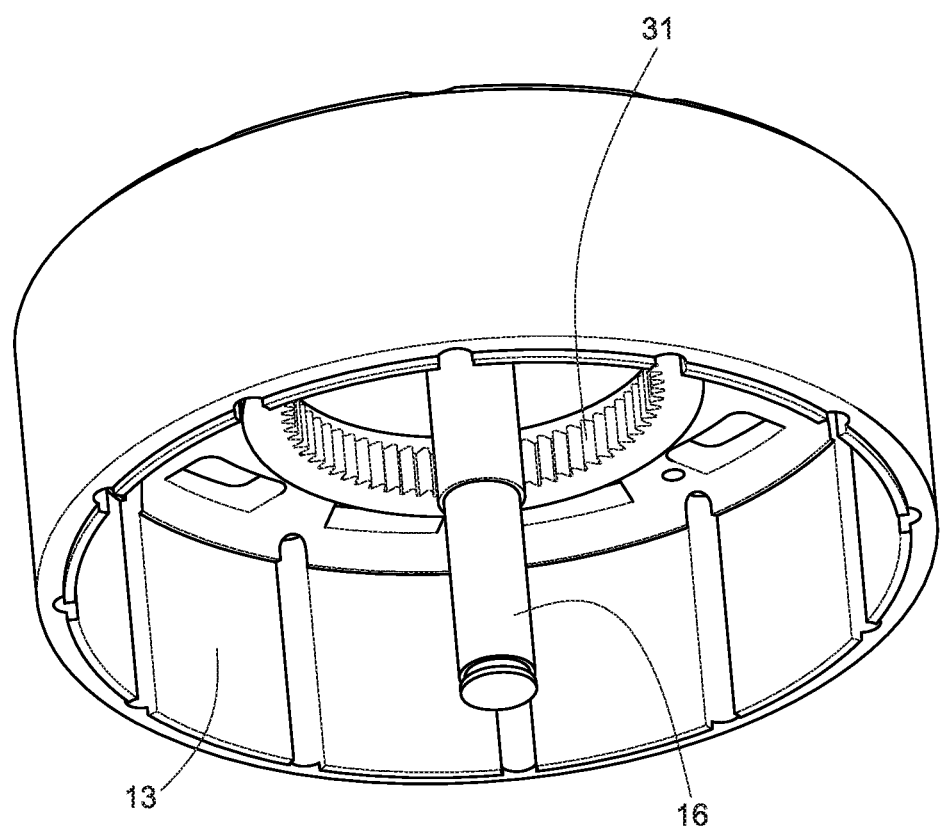
FIG. 2 is a perspective view of the first shell viewed from a different angle.
Figure 3:
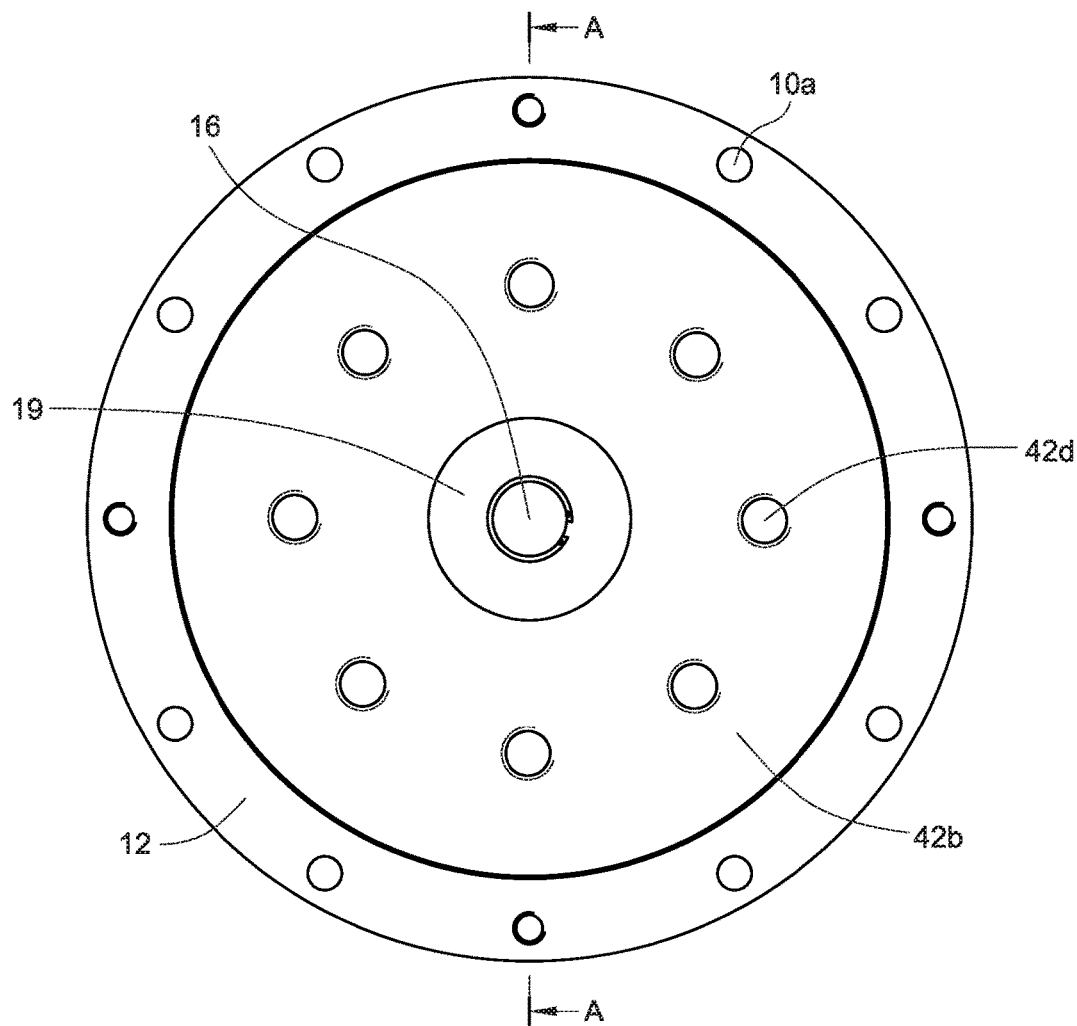
FIG. 3 is a front view of the assembled motorized gear reducer.
Figure 4:
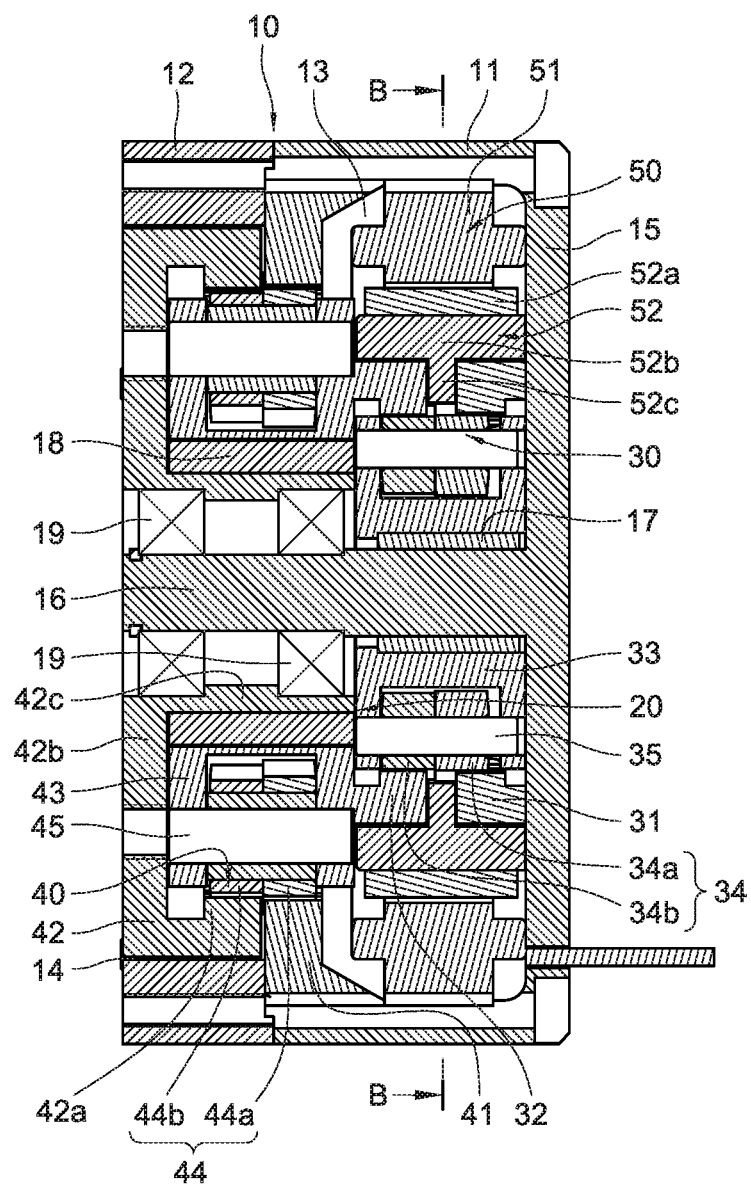
FIG. 4 is a sectional view taken along line A-A of FIG. 3.

Referring to FIGS. 1 to 6, a motorized gear reducer in accordance with a first preferred embodiment of the invention comprises a housing 10, a support shaft 16, a speed reduction device 20, and a hollow motor (e.g., brushless direct current (DC) motor) 50. As shown in FIGS. 1 and 4, the housing 10 includes a first shell 11 and a second shell 12. The first shell 11 includes a plurality of through holes 11a equally spaced apart on an edge of a disc shaped surface 15. The second shell 12 includes a plurality of threaded holes 12a on an annular portion, the threaded holes 12a being aligned with the through holes 11a respectively so that a plurality of screws 10b may be driven through the through holes 11a into the threaded holes 12 to fasten the first shell 11 and the second shell 12 together to assemble the housing 10. The housing 10 includes the surface 15 and an axial channel 14 through the second shell 12. The surface 15 is formed on an end of the first shell 11 and the channel 14 is formed through the second shell 12. The channel 14 communicates with the surface 15 so as to form a space 13 in the housing 10. The housing 10 serves to house the motorized gear reducer. As shown in FIG. 3, a plurality of holes 10a are formed through an annular edge of each of the first shell 11 and the second shell 12. A plurality of screws can be driven through the holes 10a to secure the motorized gear reducer to a target device.

As shown in FIGS. 1 and 4, the speed reduction device 20 is a multi-stage sunless planetary gear train. Specifically, the speed reduction device 20 is a two-stage sunless planetary gear train in the first preferred embodiment. The speed reduction device 20 includes a first stage of the planetary gear train 30 and a second stage of the planetary gear train 40. It is noted that the component of the second stage of the planetary gear train 40 is labeled behind the reference numeral of the component of the first stage of the planetary gear train 30 if they are identical. The first stage of the planetary gear train 30 includes a stationary ring gear 31 (41) fastened in the housing 10, a rotatable ring gear 32 (42a) served as a torque output, a carrier 33 (43) either directly or indirectly mounted on the support shaft 16 and served as a torque input, a plurality of planet gears 34 (44) equally spaced apart in both the stationary ring gear 31 (41) and the rotatable ring gear 32 (42a), the planet gears 34 (44) being mounted in the carrier 33 (44) respectively, the planet gears 34 (44) including concentrically disposed a first planet gear 34a (44a) and a second planet gear 34b (44b), the first planet gear 34a (44a) meshing the stationary ring gear 31 (41), and the second planet gear 34b (44b) meshing the rotatable ring gear 32 (42a). The carrier 43 of the second stage of the planetary gear train 40 is secured to the rotatable ring gear 32 of the first stage of the planetary gear train 30. As a result, torque can be transmitted from the first stage of the planetary gear train 30 to the second stage of the planetary gear train 40.

For a three-stage (or more than three stages) sunless planetary gear train, the second stage of the planetary gear train 40 is not the last stage of the planetary gear train. One or more stages of the planetary gear train is mounted after the second stage of the planetary gear train 40 and the last stage of the planetary gear train in order to obtain an optimum reduction ratio. Except the carrier 33 (torque input) of the first stage of the planetary gear train 30 and the rotatable ring gear (torque output) of the last stage of the planetary gear train are independent, the carrier of any remaining stage of the planetary gear train is secured to the rotatable ring gear of an adjacent stage of the planetary gear train. Thus, torque can be sequentially transmitted from one stage of the planetary gear train to an immediate next stage thereof.

As shown in FIG. 3, the rotatable ring gear 42a of the second stage of the planetary gear train 40 is combined with both a disc 42b and a sleeve 42c to form a rotatable ring gear assembly 42. The sleeve 42c is put on the support shaft 16 which is put on a bear 19. The disc 42b is taken as a torque output and has a plurality of equally spaced apart threaded holes 42d for allowing threaded fasteners to drive through and into a target device to fasten them together. The carrier 43 of the second stage of the planetary gear train 40 is put on the bearing 18 which is in turn put on the sleeve 42c. The support shaft 16 is disposed through the carrier 43 so that the carrier 43 may revolve about the support shaft 16. The rotatable ring gear 42a of the second stage of the planetary gear train 40 may be served as a torque output of the speed reduction device 20 by means of the disc 42b with the support shaft 16 extending out of the channel 14.

Figure 7:
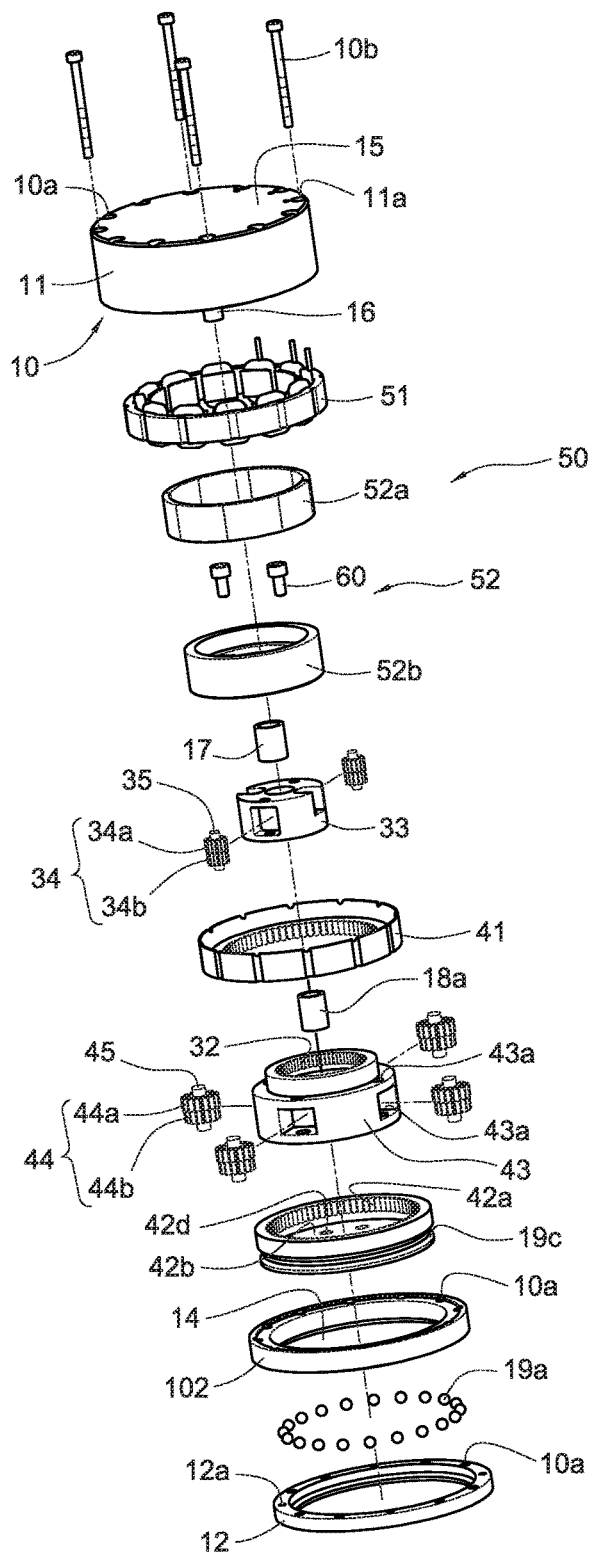
FIG. 7 is an exploded view of a motorized gear reducer according to a second preferred embodiment of the invention.
Figure 8:
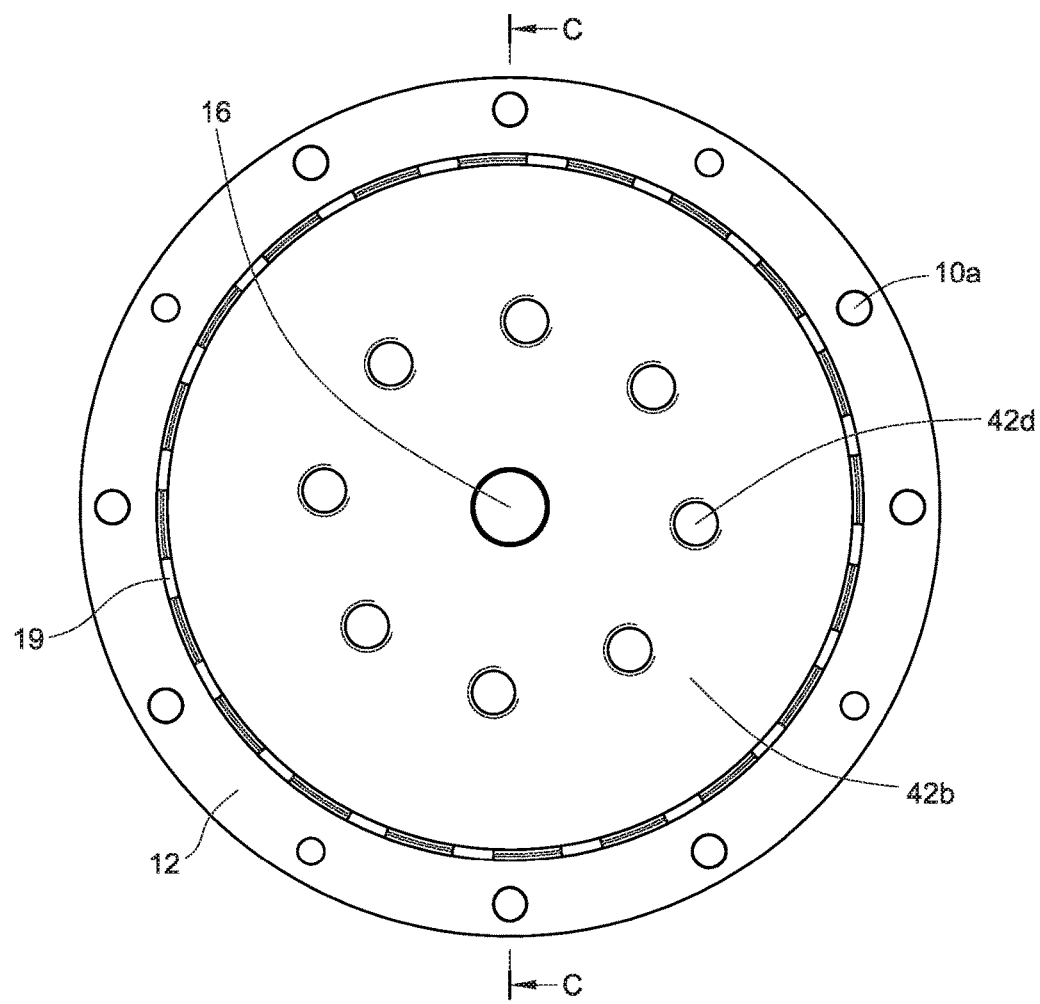
FIG. 8 is a front view of the assembled motorized gear reducer of FIG. 7.
Figure 9:
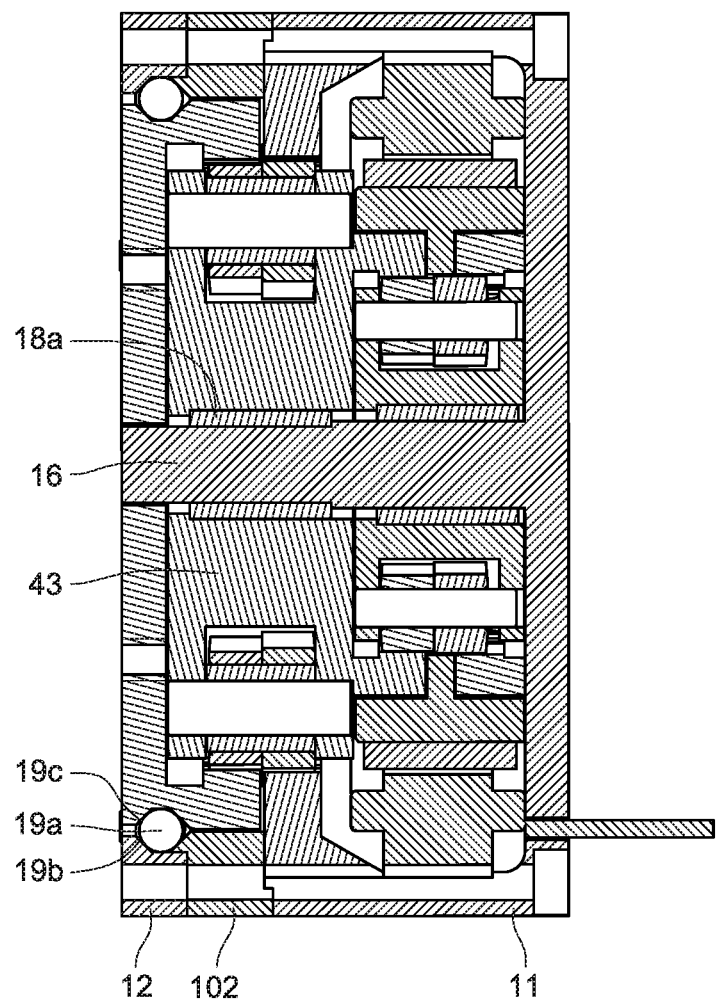
FIG. 9 is a sectional view taken along line C-C of FIG. 8.

Referring to FIGS. 7 to 9, a motorized gear reducer in accordance with a second preferred embodiment of the invention is shown. The characteristics of the second preferred embodiment are substantially the same as that of the first preferred embodiment except the following:

The rotatable ring gear 42a and the disc 42b of the second stage of the planetary gear train 40 are formed integrally as a rotatable ring gear assembly 42. The surface of the disc 42b is served as a torque output. Threaded fasteners can be driven through the threaded holes 42d into a target member for fastening the rotatable ring gear assembly 42 and the target member together. The outer surface of the rotatable ring gear assembly 42 is cylindrical. A steel ball type bearing 19a is mounted on the rotatable ring gear assembly 42 to rotatably contact the housing 10. Thus, the rotatable ring gear 42a of the second stage of the planetary gear train 40 may be served as a torque output of the speed reduction device 20 by means of the disc 42b with the support shaft 16 extending out of the channel 14. The carrier 43 of the second stage of the planetary gear train 40 is put on the bearing 18a which is in turn put on the support shaft 16. The support shaft 16 is disposed through the carrier 43 so that the carrier 43 may revolve about the support shaft 16.

The housing 10 includes the first shell 11, the second shell 12 and a ring 102 combined together. An annular first groove 19b is formed on a portion of the second shell 12 joined the ring 102 and an annular second groove 19c is formed on an outer surface of the rotatable ring gear assembly 42. The steel ball type bearing 19a is rotatably mounted in both the first and second grooves 19b and 19c.

As shown in FIGS. 1 to 9 again, the number of the planet gears 34 of the first stage of the planetary gear train 30 is two. The number of the planet gears 44 of the second stage of the planetary gear train 40 is four. The planet gears 34 (44) are equally spaced apart and internally of both the rotatable ring gear 32 (42a) and the stationary ring gear 31

(41). An axle 35 (45) is mounted through an axial line of the planet gear 34 (44) which is rotatable around the axle 35 (45) and has two ends fixedly secured to the carrier 33 (43) respectively. Holes 33a (43a) are formed from one end surface of the carrier 33 (43) to the other end surface of the carrier 33 (43) and the number of the holes 33a (43a) is equal to that of the planet gears 34 (44). In detail, both ends of the axle 35 (45) are fixedly mounted in the holes 33a (43a) respectively.

As shown in FIG. 4, the first planet gear 34a (44a) meshes the stationary ring gear 31 (41). The second planet gear 34b (44b) meshes the rotatable ring gear 32 (42a). In response to rotating the carrier 33 (43), the first planet gear 34a (44a) is guided by the stationary ring gear 31 (41) to rotate on its axis and together with the carrier 33 (43) revolved about a center. Thus, the second planet gear 34b (44b), co-rotated with the first planet gear 34a (44a), rotates the rotatable ring gear 32 (42a) which rotates in a predetermined gear reduction ratio.

Alternatively, the number of teeth of the stationary ring gear 31 (41) is different from that of the rotatable ring gear 32 (42a). In detail, the stationary ring gear 31 (41) has A1 (A2) teeth, the rotatable ring gear 32 (42a) has B1 (B2) teeth, and A1 is not equal to B1 (and A2 is not equal to B2).

Still alternatively, modulus of the first planet gear 34a (44a) is different from that of the second planet gear 34b (44b). In detail, modulus of the first planet gear 34a (44a) is X1 (X2), modulus of the second planet gear 34b (44b) is Y1 (Y2), X1 is not equal to Y1, and X2 is not equal to Y2. But the number of the teeth of the first planet gear 34a (44a) is equal to that of the second planet gear 34b (44b). The stationary ring gear 31 (41) meshes the first planet gear 34a (44a) and thus the modulus of the stationary ring gear 31 (41) is X1 (X2). Likewise, the rotatable ring gear 32 (42a) meshes the second planet gear 34b (44b) and thus the modulus of the rotatable ring gear 32 (42a) is Y1 (Y2).

Figure 5:
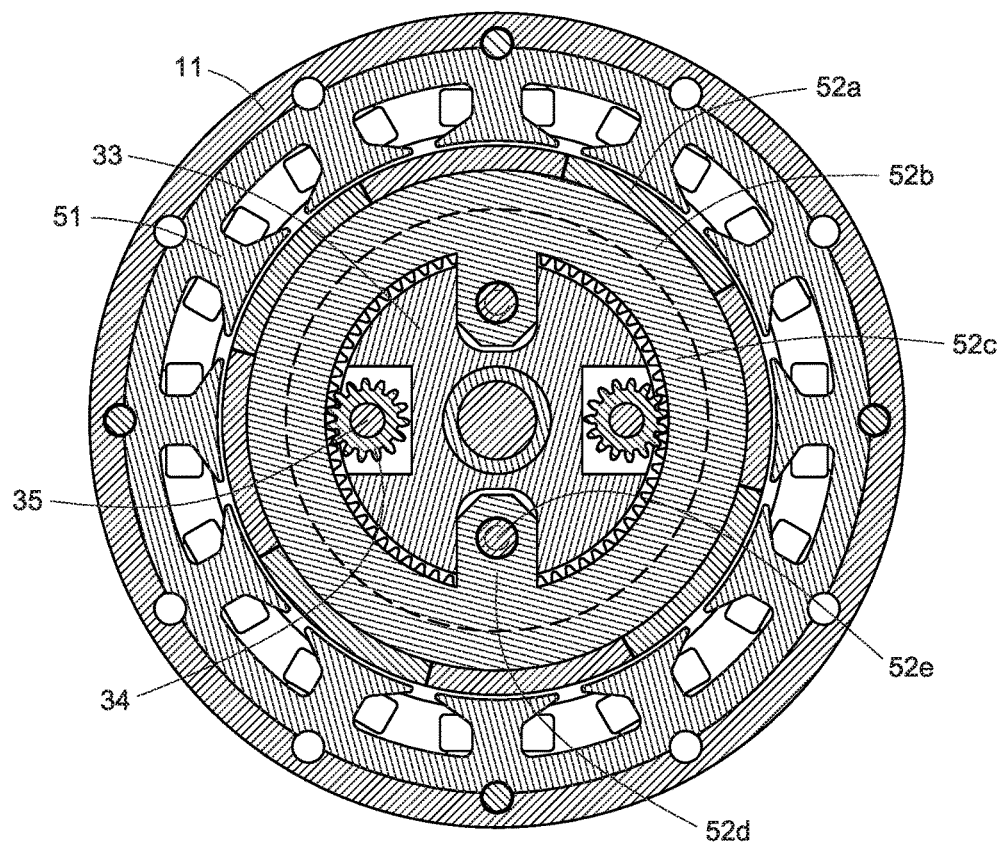
FIG. 5 is a sectional view taken along line B-B of FIG. 4.
Figure 6:
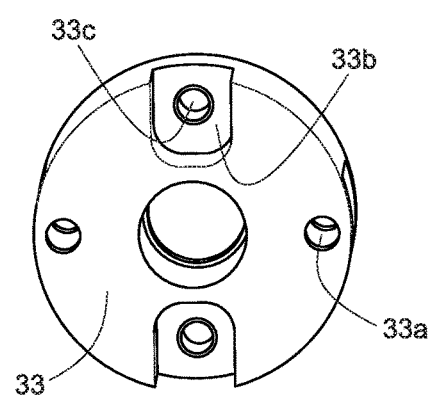
FIG. 6 is a perspective view of the carrier of FIG. 1.

As shown in FIGS. 4, 5 and 6, the hollow motor 50 is a thin hollow motor, mounted around the first stage of the planetary gear train 30, and a power source of the motorized gear reducer. The hollow motor 50 includes a rotor 52, a ring member 52c in the rotor 52 for separating the stationary ring gear 31 of the first stage of the planetary gear train 30 from the rotatable ring gear 32 thereof, the ring member 52c being around the carrier 33, two opposite projections 52d extending inward from the ring member 52c, and two holes 52e each formed through the projection 52d.

Two opposite recesses 33b are formed on the carrier 33. A threaded hole 33c is formed through each recess 33b. The projections 52d are fitted in the recesses 33b respectively. The holes 52e are aligned with the threaded holes 33c respectively. Two screws 60 are driven through the holes 52e into the threaded holes 33c respectively to fasten the rotor 52 and the carrier 33 of the first stage of the planetary gear train 30 together. A permanent magnet 52a is mounted in the rotor 52 and has an N pole and an S pole. The N and S poles together are shaped as a ring attached to a ring element 52b.

The hollow motor 50 further comprises a stator 51 disposed around the rotor 52 and within the housing 10. The stator 51 includes a plurality of slotted steel plates and windings. Electric power from a power source is supplied to the windings via a controller. Magnetic field generated by the permanent magnet 52a may co-act with current flowing through the windings to rotate the rotor 52 according to Ampere's law. As a result, the hollow motor 50 is activated. Further, the rotating rotor 52 may rotate the carrier 33 of the first stage of the planetary gear train 30 and cause the planet gears 34 to revolve about the support shaft 16. The first planet gear 34a, having the modulus X1, rotates because it meshes the stationary ring gear 31. The first planet gear 34a and the second planet gear 34b are coaxially disposed and co-rotated. In response to rotating the first planet gear 34a, the second planet gear 34b co-rotates with the first planet gear 34a rotating on the axle 35 and revolving about the support shaft 16. In the speed reduction operation, the first planet gears 34a, having the modulus X1, mesh the stationary ring gear 31 having A1 teeth, and the second planet gears 34b, having the modulus Y1, mesh the rotatable ring gear 32 having B1 teeth.

The stationary ring gear 31 is secured to the housing 10 and not adapted to rotate. The rotatable ring gear 32, having B1 teeth which are different from the A1 teeth of the stationary ring gear 31, rotates in a predetermined gear reduction ratio. The carrier 43 of the second stage of the planetary gear train 40 and the rotatable ring gear 32 of the first stage of the planetary gear train 30 are secured together. Thus, output of the rotatable ring gear 32 of the first stage of the planetary gear train 30 is input of the carrier 43 of the second stage of the planetary gear train 40. And in turn, the carrier 43 of the second stage of the planetary gear train 40 rotates. A first stage gear reduction ratio is expressed in the following expression:

$$GR1=B1/(B1-A1)$$

i.e., the first stage gear reduction ratio is equal to the number of teeth of the rotatable ring gear 32 divided by (the number of teeth of the rotatable ring gear 32 minuses the number of teeth of the stationary ring gear 31).

Further, in response to the carrier 43 of the second stage of the planetary gear train 40 being rotated by the rotatable ring gear 32 of the first stage of the planetary gear train 30, the planet gears 44 of the second stage of the planetary gear train 40 revolve about the support shaft 16. The first planet gear 44a, having the modulus X2, rotates because it meshes the stationary ring gear 41. The first planet gear 44a and the second planet gear 44b are axially disposed and co-rotated. In response to rotating the first planet gear 44a, the second planet gear 44b co-rotates with the first planet gear 44a rotating on the axle 45 and revolving about the support shaft 16. In the speed reduction operation, the first planet gears 44a, having the modulus X2, mesh the stationary ring gear 41 having A2 teeth, and the second planet gears 44b, having the modulus Y2, mesh the rotatable ring gear 42a having B2 teeth.

The stationary ring gear 41 is secured to the housing 10 and not adapted to rotate. The rotatable ring gear 42a, having B2 teeth which are different from the A2 teeth of the stationary ring gear 41, rotates in a predetermined gear reduction ratio. The disc 42b extending out of the channel 14 of the second shell 12 is taken as a torque output. A second stage gear reduction ratio is expressed in the following expression:

$$GR2=B2/(B2-A2)$$

i.e., the second stage gear reduction ratio is equal to the number of teeth of the rotatable ring gear 42a divided by (the number of teeth of the rotatable ring gear 42a minuses the number of teeth of the stationary ring gear 41). A total of the gear reduction ratio of the speed reduction device 20 is expressed below.

$$GR(total)=GR1 \times GR2$$

i.e., the total of the gear reduction ratio of the speed reduction device 20 is equal to a multiplication of the first stage gear reduction ratio and the second stage gear reduction ratio.

It is noted that the number of teeth of the rotatable ring gear deducted by the number of teeth of the stationary ring gear should be a multiple of the number of the planet gears. A maximum speed reduction can be obtained if the multiple is one.

In view of above description, the invention has the following characteristics: The sun gear of the planetary gear train of the conventional speed reduction device is eliminated and replaced with another ring gear, i.e., a total of two ring gears. Further, the space previously occupied by the sun gear is used to accommodate a support shaft with the planetary gear trains being adapted to revolve about. A high gear reduction ratio is obtained by dividing the number of teeth of the rotatable ring gear by a difference of the number of teeth of the rotatable ring gear and the number of teeth of the stationary ring gear. The rotor is disposed around the first stage of the planetary gear train to separate one ring gear of the first stage of the planetary gear train from the other ring gear of the first stage of the planetary gear train. Furthermore, the rotor is secured to the carrier of the first stage of the planetary gear train. The space of the motorized gear reducer is greatly reduced.

The invention has the following advantages: Gear reduction ratio is greatly increased with space of the motorized gear reducer being greatly reduced. The construction is greatly simplified to provide a compact motorized gear reducer having a high gear reduction ratio.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A motorized gear reducer disposed in a housing, the housing having a closed surface at a first end and an axial channel through a second end, comprising:
   a support shaft axially disposed in the housing and having a first end secured to the closed surface and a second end passing through the axial channel;
   a speed reduction device including a first stage of a sunless planetary gear train and a second stage of the sunless planetary gear train, each of the first and second stages of the sunless planetary gear train including a stationary ring gear, a rotatable ring gear serving as a torque output of each of the first and second stages of the sunless planetary gear train, and a carrier mounted on the support shaft and serving as a torque input of each of the first and second stages of the sunless planetary gear train;
   a planet gear set disposed in each of the carriers of the first and second stages of the sunless planetary gear train and including a first planet gear meshing with the stationary ring gear of each of the first and second stages of the sunless planetary gear train, respectively, and a second planet gear meshing with the rotatable ring gear of each of the first and second stages of the sunless planetary gear train, respectively, wherein the carrier of the first stage of the sunless planetary gear train is secured to an internal ring member of a rotor of a hollow motor to serve as a power source of the speed reduction device, and the torque output of the second stage of the sunless planetary gear train serves as one torque output of the speed reduction device; and
   the hollow motor surrounding the first stage of the sunless planetary gear train and including a stator on an outermost portion, the rotor surrounded by the stator and driven by the stator, and a plurality of windings for rotating the rotor;
   wherein the stator is disposed in the housing;
   wherein the rotor includes the internal ring member extending radially to separate the stationary ring gear of the first stage of the sunless planetary gear train from the rotatable ring gear of the first stage of the sunless planetary gear train, and the ring member being around the carrier of the first stage of the sunless planetary gear train;
   wherein the number of teeth of the first planet gear of each of the first and second stages of the sunless planetary gear train is equal to that of the second planet gear of each of the first and second stages of the sunless planetary gear train;
   wherein the number of teeth of the rotatable ring gear of each of the first and second stages of the sunless planetary gear train is not equal to that of the stationary ring gear of each of the first and second stages of the sunless planetary gear train, respectively; and
   wherein the number of teeth of the rotatable ring gear of each of the first and second stages of the sunless planetary gear train deducted by the number of teeth of the stationary ring gear of each of the first and second stages of the sunless planetary gear train, respectively, is a multiple of the number of the planet gear sets in the speed reduction device.

2. The motorized gear reducer of claim 1, wherein a modulus of the first planet gear of each of the first and second stages of the sunless planetary gear train is different from that of the second planet gear of each of the first and second stages of the sunless planetary gear train, respectively, a modulus of the stationary ring gear of each of the first and second stages of the sunless planetary gear train is equal to that of the first planet gear of each of the first and second stages of the sunless planetary gear train, respectively, and a modulus of the rotatable ring gear of each of the first and second stages of the sunless planetary gear train is equal to that of the second planet gear of each of the first and second stages of the sunless planetary gear train, respectively.

3. The motorized gear reducer of claim 1, wherein each stationary ring gear is fastened in the housing.

4. The motorized gear reducer of claim 1, wherein the first planet gear and the second planet gear of each of the first and second stages of the sunless planetary gear train are coaxially disposed and co-rotated, and each carrier includes two holes at two ends, respectively, the holes being adapted to rotatably fasten two ends of an axis shaft of each of the first and second planet gears of each of the first and second stages of the sunless planetary gear train, respectively, together.

5. The motorized gear reducer of claim 1, wherein the rotatable ring gear of the second stage of the sunless planetary gear train is combined with both a disc and a sleeve to form a rotatable ring gear assembly, the sleeve is put on the support shaft, and an end surface of the disc is taken as the torque output of the second stage.

6. The motorized gear reducer of claim 1, wherein the rotatable ring gear of the second stage of the planetary gear train is integrally formed with a disc to form a rotatable ring gear assembly having a cylindrical surface contacting the housing, and an end surface of the disc is taken as the torque output of the second stage.

7. The motorized gear reducer of claim 1, further comprising two opposite projections extending inward from the ring member, and a hole member formed through each projection, two opposite recesses formed on the carrier of the first stage of the sunless planetary gear train, and a threaded hole formed through each recess, wherein the projections are fitted in the recesses, respectively, the hole members are aligned with the threaded holes, respectively, and a screw is driven through each hole member into the threaded holes, respectively, to fasten the rotor and the carrier of the first stage of the planetary gear train together.

8. The motorized gear reducer of claim 1, wherein the hollow motor is a brushless direct current (DC) motor.

\* \* \* \* \*